United States Patent
McNeal et al.

(10) Patent No.: US 12,290,012 B2
(45) Date of Patent: May 6, 2025

(54) GROUND TREATMENT DEVICE

(71) Applicant: Subversive Tools Inc., Cookeville, TN (US)

(72) Inventors: Carson McNeal, Doyle, TN (US); Conor Crickmore, Claryville, NY (US)

(73) Assignee: Subversive Tools Inc., Cookeville, TN (US)

( * ) Notice: Subject to any disclaimer, the term of this patent is extended or adjusted under 35 U.S.C. 154(b) by 0 days.

(21) Appl. No.: 18/213,797

(22) Filed: Jun. 23, 2023

(65) Prior Publication Data

US 2024/0122085 A1    Apr. 18, 2024

Related U.S. Application Data

(60) Provisional application No. 63/415,404, filed on Oct. 12, 2022.

(51) Int. Cl.
| | |
|---|---|
| *A01B 1/06* | (2006.01) |
| *A01B 33/02* | (2006.01) |
| *A01B 35/28* | (2006.01) |
| *A01B 76/00* | (2006.01) |

(52) U.S. Cl.
CPC ............ *A01B 1/065* (2013.01); *A01B 33/028* (2013.01); *A01B 35/28* (2013.01); *A01B 76/00* (2013.01)

(58) Field of Classification Search
CPC ......... A01B 1/065; A01B 76/00; A01B 35/28; A01B 35/16; A01B 33/028
USPC ......................................................... 172/42
See application file for complete search history.

(56) References Cited

U.S. PATENT DOCUMENTS

| | | | | |
|---|---|---|---|---|
| 1,320,875 | A * | 11/1919 | Lesh ..................... | A01B 1/06 172/555 |
| 2,458,200 | A * | 1/1949 | Renfroe et al. ........ | A01D 34/37 56/17.6 |
| 2,629,220 | A * | 2/1953 | Grieder ................. | A01G 3/067 56/17.6 |
| 3,054,247 | A * | 9/1962 | Roesler ................. | A01D 34/53 37/243 |
| 4,049,059 | A * | 9/1977 | Weibling ............. | A01B 33/027 172/15 |
| 4,213,504 | A * | 7/1980 | Schneider ............ | A01B 33/06 172/41 |
| 4,601,163 | A * | 7/1986 | Trelford .............. | A01B 45/026 56/364 |

(Continued)

OTHER PUBLICATIONS

6 Best Garen Tillers, Feb. 2, 2019, printed from https://www.familyhandyman.com/list/best-reviewed-garden-tillers/ on Jun. 9, 2023, 13 pages.

(Continued)

*Primary Examiner* — Christopher J Sebesta
*Assistant Examiner* — Joel F. Mitchell
(74) *Attorney, Agent, or Firm* — LaBatt, LLC

(57) ABSTRACT

A ground treatment device including a housing fabricated from at least one injection molded part. An axle with a ground treatment attachment mounted thereto can be rotatably secured to opposing sides of the housing. The housing can include a gear housing structure which is configured to house gears for enabling operation of the ground treatment attachment using a power tool. An upper frame can be secured to opposing sides of the housing. The ground treatment attachment can be configured to cultivate the ground.

9 Claims, 10 Drawing Sheets

(56) References Cited

U.S. PATENT DOCUMENTS 5,048,617 A * 9/1991 Haven ................. A01B 33/027
 172/62
5,488,819 A * 2/1996 Aiyama ................ A01B 1/065
 172/540

OTHER PUBLICATIONS

Tilther Instruction Manual. Johnny's Selected Seeds, 2018. 3 pages.
Ellia 3000, printed from https://curlysag.com/ellia-3000-kits/ on Jul. 5, 2023 (product available prior to Oct. 12, 2022), 6 pages.
DIY Tilther, Farmer Keith, Mar. 4, 2020, printed from https://www.youtube.com/watch?v=Fck7P6hZYXw on Nov. 15, 2022, 1 page.
Kit—A Frame mounted 30" bed top Tilther, printed from https://farm-ng.com/products/a-frame-mounted-30-bed-top-tilther on Nov. 15, 2022, 1 page.

* cited by examiner

GROUND TREATMENT DEVICE

REFERENCE TO RELATED APPLICATIONS

The current application claims the benefit of U.S. Provisional Application Ser. No. 63/415,404, which was filed on 12 Oct. 2022, and which is hereby incorporated by reference.

TECHNICAL FIELD

The disclosure relates generally to ground treatment devices, such as a cultivator, and more particularly, to a hand operated cultivator for loosening and smoothing compost and/or soil.

BACKGROUND ART

A hand operated cultivator (or tilther) is often used on small scale farms for mixing fertilizer, loosening or smoothing soil or compost, and preparing a bed for planting. A currently available hand operated cultivator uses a battery-operated drill to turn a series of blades. The drill is secured on a housing that covers the blades and can be operated using a wire that can selectively squeeze the trigger. To date, the housings on such cultivators are fabricated from a metal, such as sheet metal, stainless steel, aluminum, or the like.

SUMMARY OF THE INVENTION

Aspects of the invention provide a ground treatment device, such as a cultivator, which addresses one or more issues of current ground treatment devices. Embodiments of a ground treatment device include a housing fabricated from at least one injection molded part. An axle with a ground treatment attachment mounted thereto can be rotatably secured to opposing sides of the housing. In embodiments, the housing can include a gear housing structure which is configured to house gears for enabling operation of the ground treatment attachment using a power tool. Embodiments include an upper frame secured to opposing sides of the housing. In a more particular embodiment, the ground treatment attachment can be configured to cultivate the ground.

A first aspect of the invention provides a cultivator comprising: a housing structure comprising: a blade housing fabricated from at least one injection molded part; and an upper frame secured to opposing sides of the blade housing; an operating handle structure secured to the housing structure; and a blade structure located in an interior portion of the blade housing and rotatably secured to opposing sides of the blade housing.

A second aspect of the invention provides a ground treatment device comprising: a housing fabricated from a single injection molded piece, the housing comprising: an elevated front portion; an elongated back portion; opposing sides, each side including a bearing slot for mounting an axle thereto; a frame mounting structure located on a first exterior side of the housing; and a gear housing structure located on another exterior side of the housing, wherein the gear housing structure has an outward facing interior region; and an axle located on an interior portion of the housing, wherein the axle is rotatably mounted to the bearing slots on the opposing sides, and wherein the axle includes a ground treatment attachment mounted thereto.

A third aspect of the invention provides a ground treatment device comprising: a housing fabricated from a single injection molded piece, the housing comprising: an elevated front portion; an elongated back portion; opposing sides, each side including a bearing slot for mounting an axle thereto; a frame mounting structure located on a first exterior side of the housing; a drill bit mounting structure located on an external top surface of the housing; and a gear housing structure located on another exterior side of the housing, wherein the gear housing structure has an outward facing interior region including: a drill gear mounting structure aligned with a drill bit opening in the gear housing structure; an axle gear mounting structure aligned with the bearing slot for the axle; a drill gear mounted to the drill gear mounting structure; an axle gear mounted to the axle gear mounting structure, wherein the axle is attached to the axle gear; and a drive chain mounted to the drill gear and the axle gear; an axle located on an interior portion of the housing, wherein the axle is rotatably mounted to the bearing slots on the opposing sides, and wherein the axle includes a ground treatment attachment mounted thereto; and an upper frame secured to opposing sides of the housing, wherein the upper frame encloses the outward facing interior region of the gear housing structure, and wherein the upper frame is fabricated from metal.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the invention provide a ground treatment device, such as a cultivator, which addresses one or more issues of current ground treatment devices. Embodiments of a ground treatment device include a housing fabricated from at least one injection molded part. An axle with a ground treatment attachment mounted thereto can be rotatably secured to opposing sides of the housing. In embodiments, the housing can include a gear housing structure which is configured to house gears for enabling operation of the ground treatment attachment using a power tool.

Embodiments include an upper frame secured to opposing sides of the housing. In a more particular embodiment, the ground treatment attachment can be configured to cultivate the ground.

Further aspects of the invention are shown and described in conjunction with a cultivator, which is configured to be used with a cordless drill. However, it is understood that this particular configuration is only illustrative of various configurations for ground treatment devices and power tools that can be utilized in embodiments of the invention.

Figure 1:
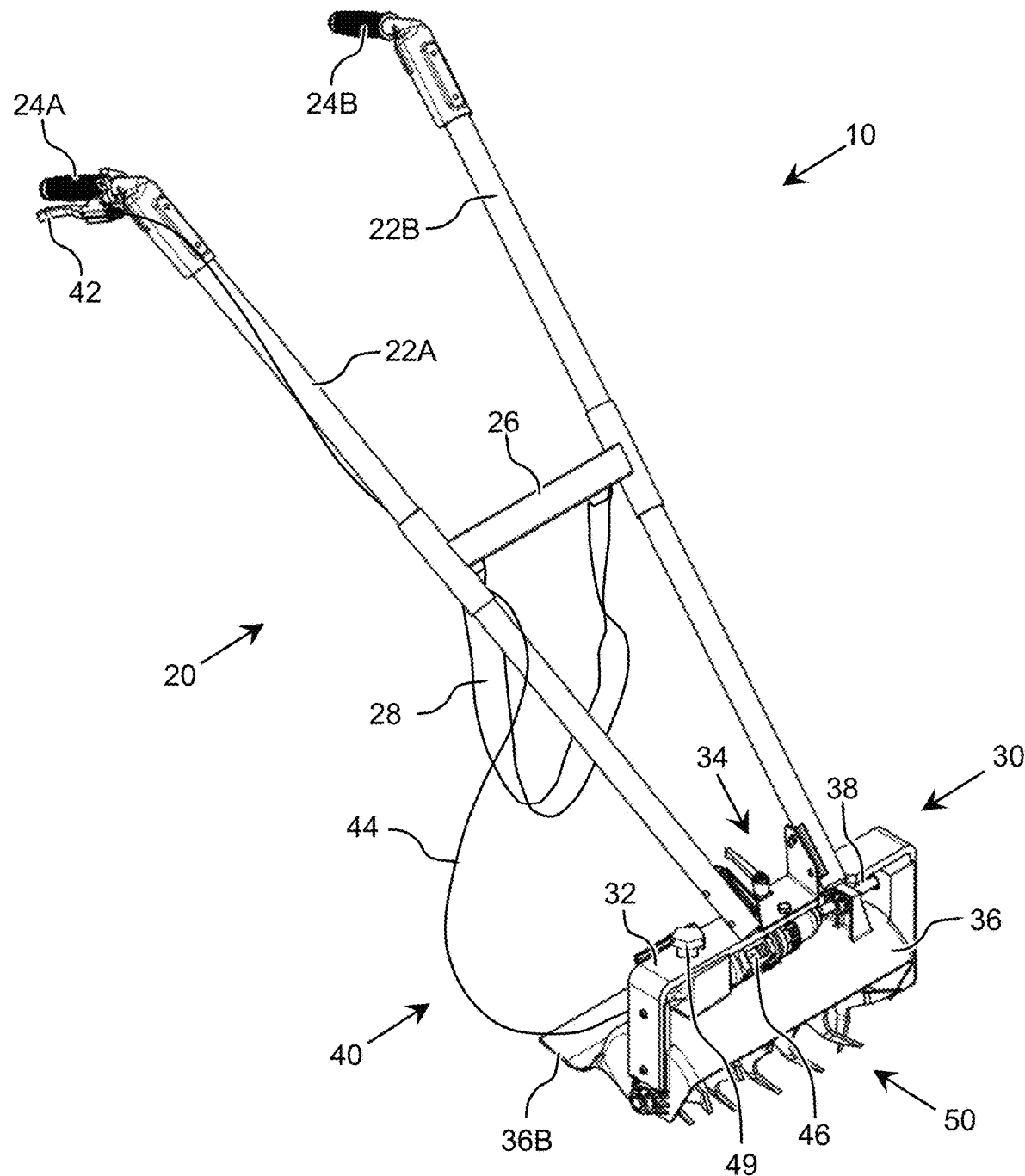
FIG. 1 shows an illustrative cultivator according to an embodiment.

Turning to the drawings, FIG. 1 shows an illustrative cultivator 10 according to an embodiment. As illustrated, the cultivator 10 includes an operating handle structure 20, a housing structure 30, a blade engagement component 40, and a blade structure 50. Illustrative features of an embodiment of each of these structures and components will be further described in conjunction with all the figures shown herein.

An embodiment of the operating handle structure 20 can include a pair of handles 22A, 22B (e.g., wooden, aluminum, polyvinyl chloride (PVC), and/or the like), each with a corresponding grip 24A, 24B (e.g., rubber, plastic, and/or the like) for a user to hold onto while operating the cultivator 10. The handles 22A, 22B can be arranged at a fixed angle with respect to each other by a stabilization bar 26 (e.g., metal, aluminum, PVC, and/or the like). A carrying strap 28 also can be attached to each handle 22A, 22B and/or the stabilization bar 26 to facilitate carrying the cultivator 10 when it is not in use. While not shown, it is understood that the cultivator 10 can include other components to facilitate moving the cultivator 10 during use and/or when not in use. For example, the cultivator 10 can include a set of wheels.

In an embodiment, each handle 22A, 22B comprises a single elongate pole-like structure which can be routed through an opening in the stabilization bar 26. Alternatively, each handle 22A, 22B can comprise two elongate pole-like structures, each having an end inserted into an opening in the stabilization bar 26. As illustrated, each grip 24A, 24B can be attached to an end of a corresponding handle 24A, 24B using any solution (e.g., glue, fasteners, and/or the like). Furthermore, a grip 24A, 24B can be attached at an angle. The angle can be configured to cause the grips 24A, 24B to be approximately parallel to ground on which the cultivator 10 is being utilized. However, it is understood that this is only illustrative of various configurations.

Figure 2:
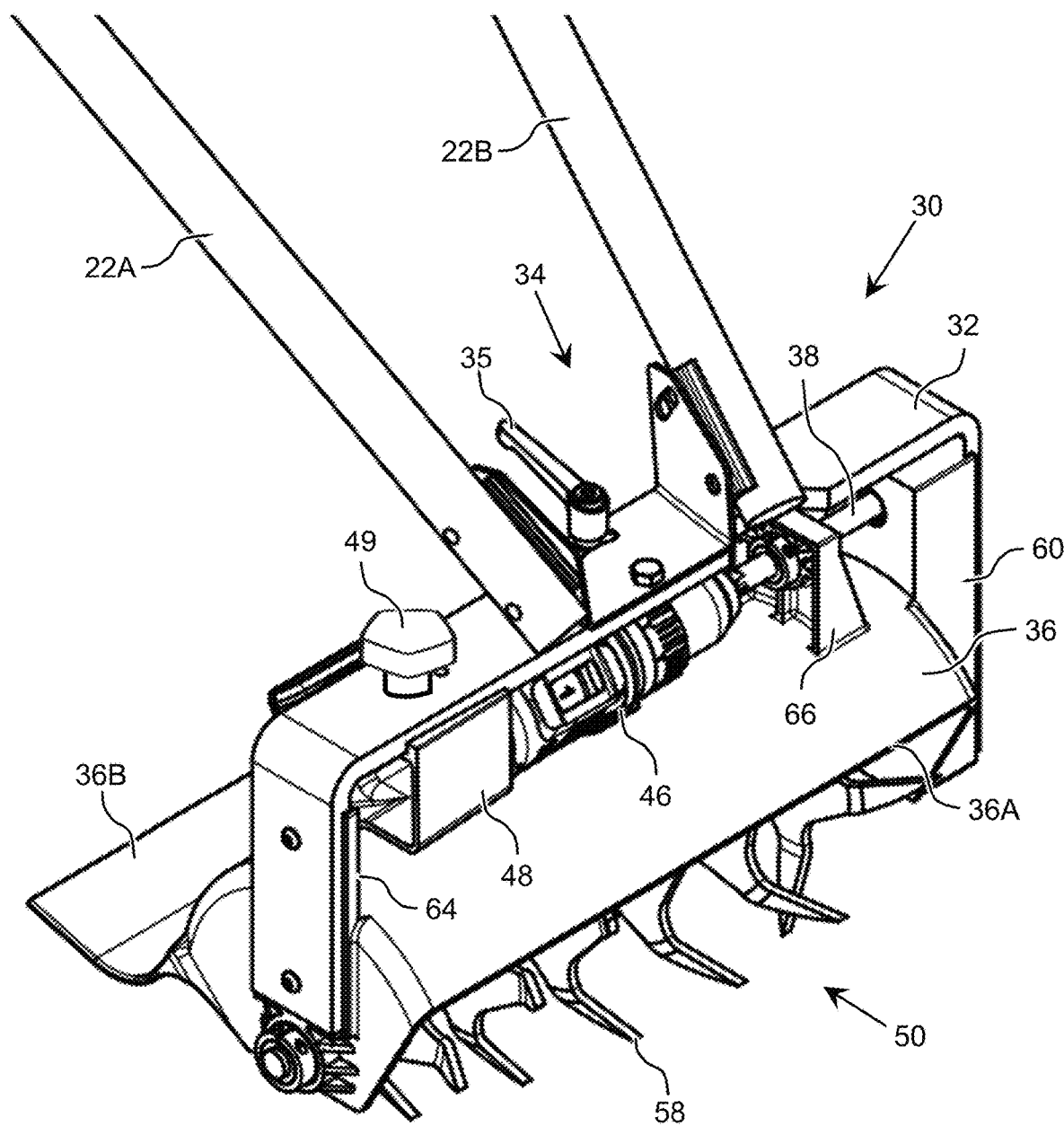
FIG. 2 shows a detail view of an illustrative housing structure and housing handle attachment of a cultivator according to an embodiment.

FIG. 2 shows a detail view of an illustrative housing structure 30 and housing handle attachment of a cultivator 10 according to an embodiment. As illustrated, the handles 22A, 22B can be secured to an upper frame 32 of the housing structure 30 using a handle attachment structure 34, which can include, for example, a metal bracket, bolts, and screws with corresponding nuts. In an embodiment. the handle attachment structure 34 can be selectively rotated with respect to the upper frame 32, e.g., to facilitate operation of the cultivator 10 while walking on a left or right side of the path of the cultivator 10. In an embodiment, such a rotation can be implemented using a lever bolt 35, which can be loosened to enable rotation of the handles 22A, 22B to a desired orientation with respect to the upper frame 32, and tightened to secure the handles 22A, 22B in the selected orientation with respect to the upper frame 32.

Additionally, as shown in FIG. 1, the blade engagement component 40 is shown including a throttle control lever 42 mounted to one of the grips, such as the grip 24A. The throttle control lever 42 is shown attached to a throttle cable 44, which can be utilized to selectively engage a trigger of a drill 46. To this extent, FIG. 3 shows a detail view of an illustrative housing structure 30 and upper frame 32 securing a drill 46 of a cultivator 10 according to an embodiment.

Figure 3:
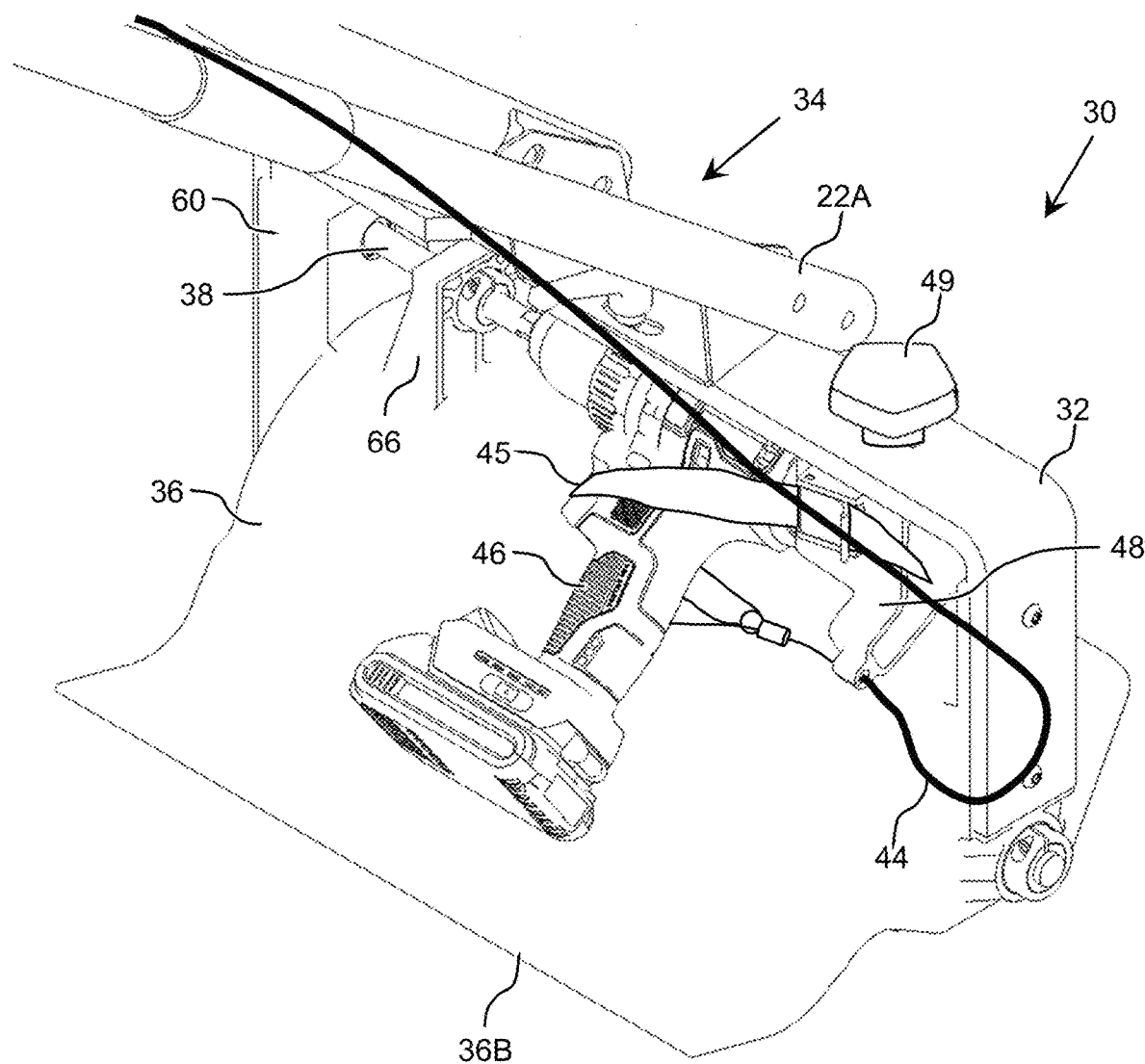
FIG. 3 shows a detail view of an illustrative housing structure and upper frame securing a drill of a cultivator according to an embodiment.

As illustrated in FIGS. 1-3, the drill 46 can be secured using a drill block 48, which can be moved laterally within the upper frame 32 to facilitate insertion and removal of the drill 46 and to accommodate drills 46 of varying sizes. The drill block 48 can be secured in place using a drill block handle 49, which can be utilized to turn a screw that can selectively secure the drill block 48 at a desired location. The throttle cable 44 is attached to one end of a trigger strap 45, the other end of which can be adjustably secured to the drill block 48 using any solution, such as a cam buckle. The trigger strap 45 can be wrapped around the trigger of the drill 46 and be adjusted such that when the user pulls the throttle control lever 42, the drill 46 turns on, and when the user releases the throttle control lever 42 the drill 46 turns off.

While use of a drill 46, such as a cordless drill, is shown, it is understood that any of various types of portable power tools which generate a rotating motion when activated can be utilized. For example, other embodiments can utilize a rotary tool, an angle grinder, a driver, and/or the like. Furthermore, an embodiment of a power tool can be powered by any power source, including compressed air, an internal combustion engine, the electric grid via a power cord, and/or the like. Still further, embodiments can utilize a power tool fabricated specifically for use in conjunction with the cultivator 10. In this case, the power tool can be more permanently secured to the housing structure 30 using any solution.

Figure 4:
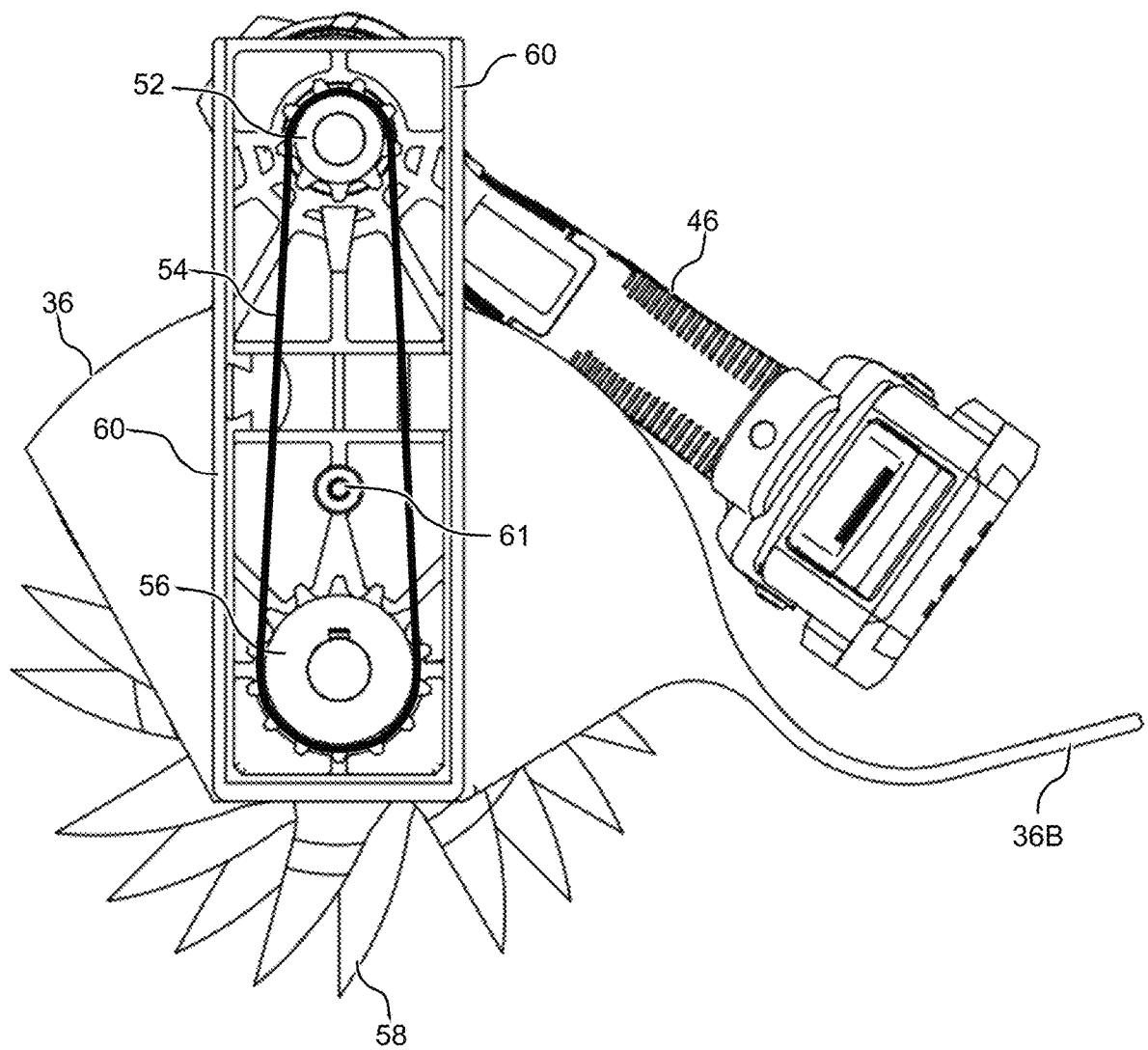
FIG. 4 shows a detail view of an illustrative drill to blade axle interface of a cultivator according to an embodiment.
Figure 5:
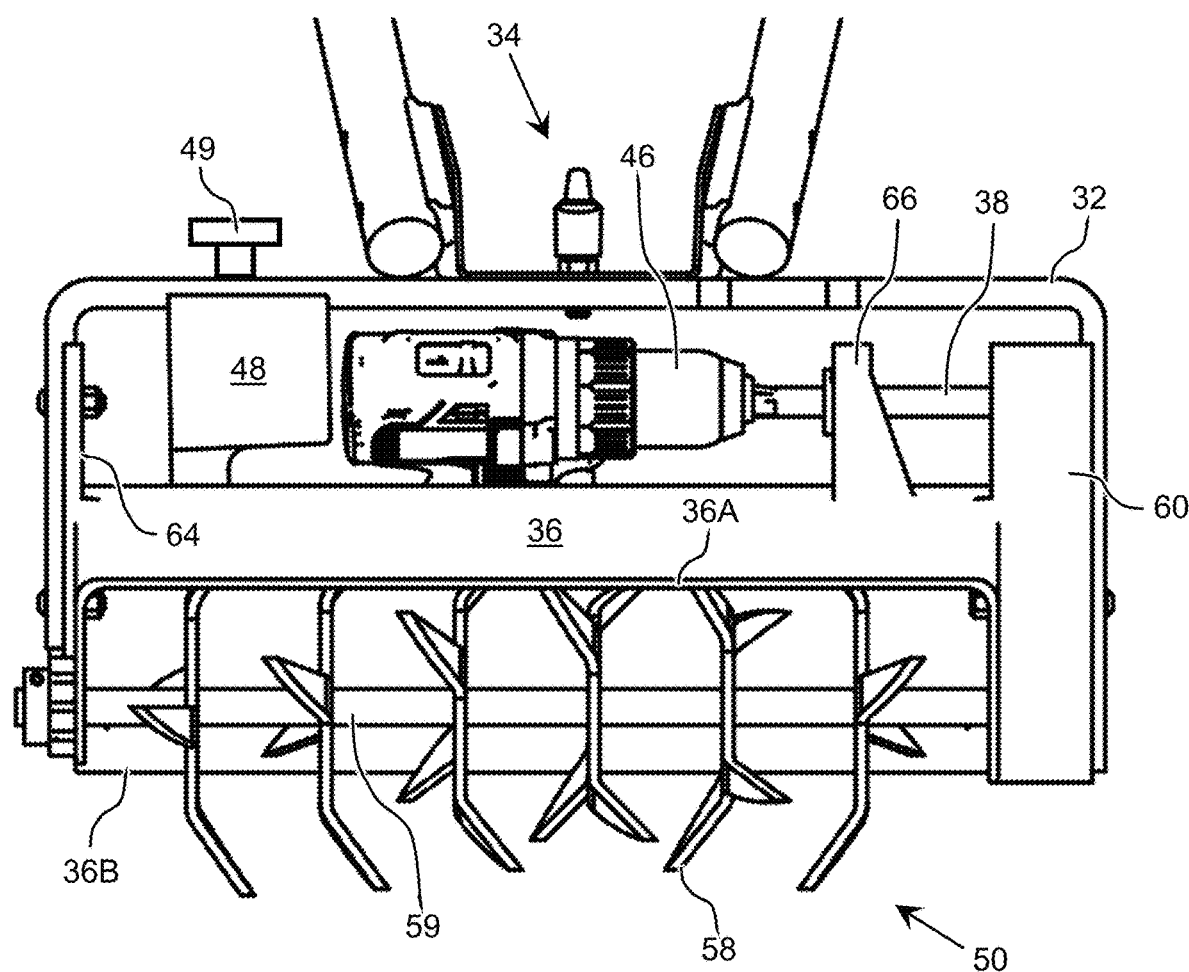
FIG. 5 shows a detail view of an illustrative blade housing and blade structure of a cultivator according to an embodiment.

FIG. 4 shows a detail view of an illustrative drill 46 to blade axle interface of a cultivator 10 according to an embodiment, and FIG. 5 shows a detail view of an illustrative blade housing 36 and blade structure 50 of a cultivator 10 according to an embodiment. As illustrated in FIGS. 4 and 5, the drill 46 can be attached to a drill bit 38 such that when the drill 46 is on, the drill bit 38 rotates. The drill bit 38 can be mounted between a drill bit mounting structure 66, which can include a bearing, and a gear housing 60. Within the gear housing 60, the drill bit 38 is attached to a drill gear 52, which rotates due to rotation of the drill bit 38. This rotation causes rotation of a drive chain 54, which transfers the rotation to a blade axle gear 56 connected to the axle 59 of the blades 58. This rotation of the blade axle gear 56 causes the blade axle 59, and therefore the blades 58, to rotate.

The gears 52, 56 and drive chain 54 can be enclosed in a gear housing 60 to protect the components from the elements. The gear housing 60 and blade housing 36 can be attached to the upper frame 32 using any solution. For example, as shown in FIG. 5, each side of the upper frame 32 can be secured to the blade housing 36 using, for example, one or more of screws or bolts, which can be secured via corresponding socket(s) 61 (FIG. 4) located in a frame mounting structure 64 and/or the gear housing 60 of the blade housing 36. In particular, a socket 61 can be threaded to allow the bolt or screw to be screwed therein. Alternatively, a socket 61 can be an opening through which a bolt or screw can be inserted and secured in place with a nut on an opposite side of the head. The upper frame 32 can be configured to fully enclose the gear housing 60 when secured to the gear housing 60 side of the blade housing 36.

The blade structure 50 can include a plurality of blades 58 secured to a blade axle 59. The blade axle 59 is rotatably secured to opposing ends of the blade housing 36 using any solution, such as bearings, and can be rotated by rotation of the blade axle gear 56 (FIG. 4) as discussed herein. While a particular number of blades 58 are illustrated, it is understood that embodiments can include any number of blades 58. Furthermore, embodiments can utilize a different ground treatment attachment other than blades 58 to perform any of various desired ground treatment operations. For example, embodiments can include tines for aeration or dethatching, blades for cutting vegetation, and/or the like.

In general, during use of the cultivator 10, the user can pull the throttle control lever 42, which causes the drill 46 to turn on. The rotation of the drill bit 38 causes the blade axle 59 and corresponding blades 58 to rotate. Rotation of the blades 58 into the soil/compost will cause the cultivator 10 to move in a forward direction. The blades 58 will break up, loosen, and mix the soil/compost as they enter and exit the soil/compost. The blade housing 36 can facilitate mixing by containing the soil/compost that is lifted by the blades 58 and allowing it to be loosely deposited at the top of the area being cultivated.

The blade housing 36 can include an elevated front portion 36A, and an elongated back portion 36B. During operation of the cultivator 10, the elevated front portion 36A can allow the rotating blades 58 to engage and mix the soil and/or compost, while the elongated back portion 36B can travel along the surface, preventing debris from exiting the rear of the cultivator 10 and assisting in smoothing a surface of the soil and/or compost as the cultivator 10 moves along the surface.

In an embodiment, the blade housing 36, including the frame mounting structure 64, the drill bit mounting structure 66, and the gear housing 60, are fabricated using one or more parts formed by injection molding. In a more particular embodiment, the blade housing 36, the frame mounting structure 64, the drill mounting structure 66, and the gear housing 60 are fabricated using a single injection molded part. In an embodiment, each injection molded part is fabricated using a polymer which provides a rigid material that will not easily break.

Use of an injection molded part can reduce wear due to rust and can reduce movement, denting, and flexing of the blade housing 36 during use, which can occur with the metal parts used in the prior art. Additionally, use of the injection molded blade housing 36 can reduce a number of parts, an amount of material to form the structure, and is lighter than the use of metal. As a result, an overall weight of the cultivator 10 can be reduced, making it easier for a single person to carry and use. Still further, the injection molded blade housing 36 does not require welding, which can introduce a weakness, especially where rocks can wedge the structure apart over time.

The inventors have also found that soil and compost do not stick to the injection molded blade housing 36 as they do with metal-based housings. Such sticking reduces the cultivation effect of the soil/compost being rotated through the blade housing 36 and softening of the soil/compost. Furthermore, the blade housing 36 can be designed with an improved shape, which can result in a smoother bed without ridges of soil/compost as are present with previous cultivators.

FIGS. 6A-6J show top, bottom, front, back, left side, right side, and various perspective views, respectively, views of an illustrative blade housing 36 for a cultivator 10 according to an embodiment, which can be fabricated using injection molding.

As illustrated, the injection molded blade housing 36 can include an elevated front end 36A, an elongated back end 36B, a gear housing 60, bearing slots 62A, 62B for the blade axle, a frame mounting structure 64 for mounting the upper frame 32 to the blade housing 36, and a drill bit mounting structure 66 for securing the drill 46 and drill bit 38 in place, all of which can be fabricated using a single injection molded part.

Figure 6A:
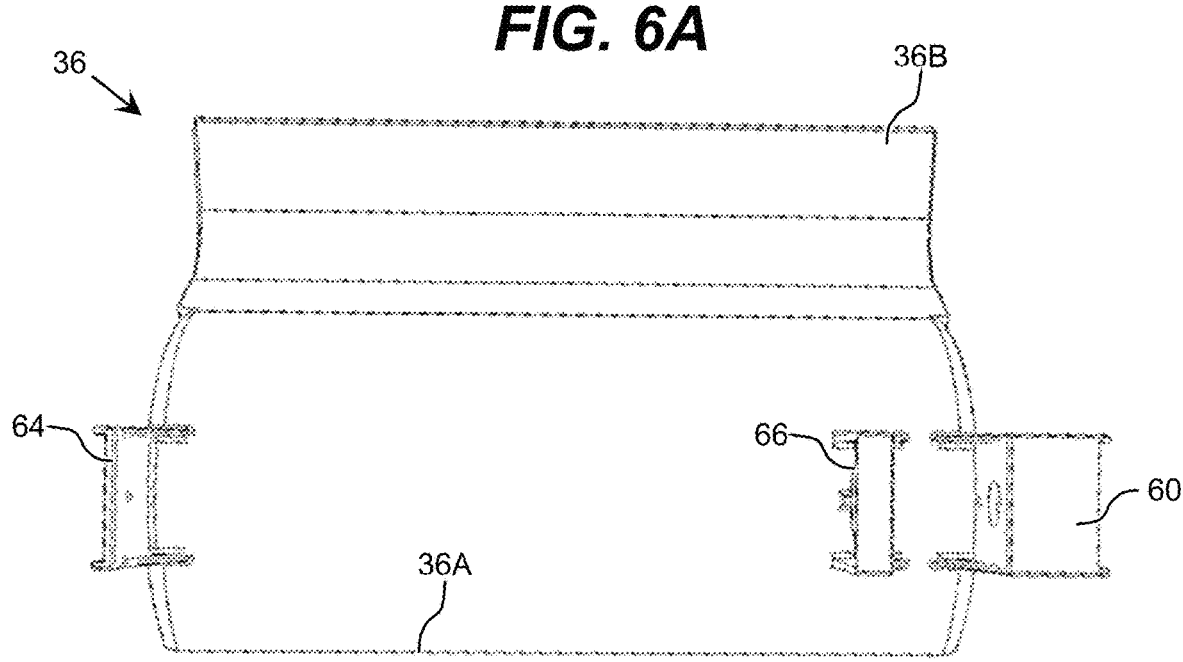
FIGS. 6A-6J show various views of an illustrative blade housing for a cultivator according to an embodiment.
Figure 6B:
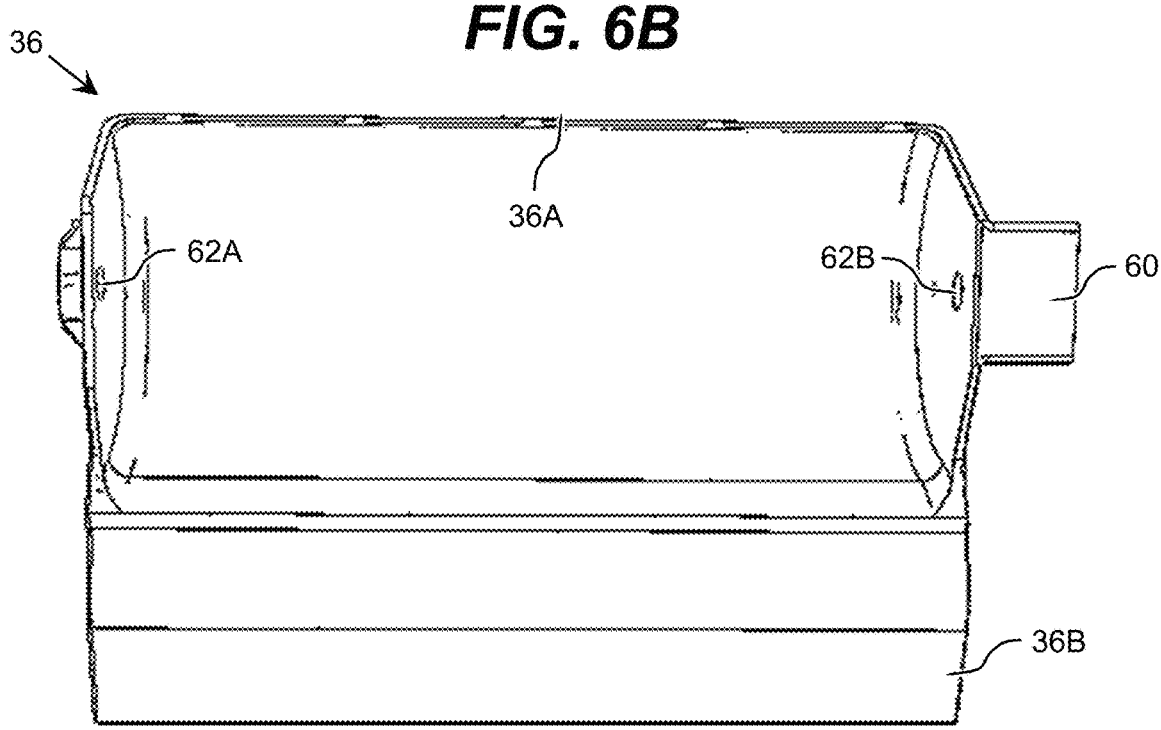
Figure 6C:
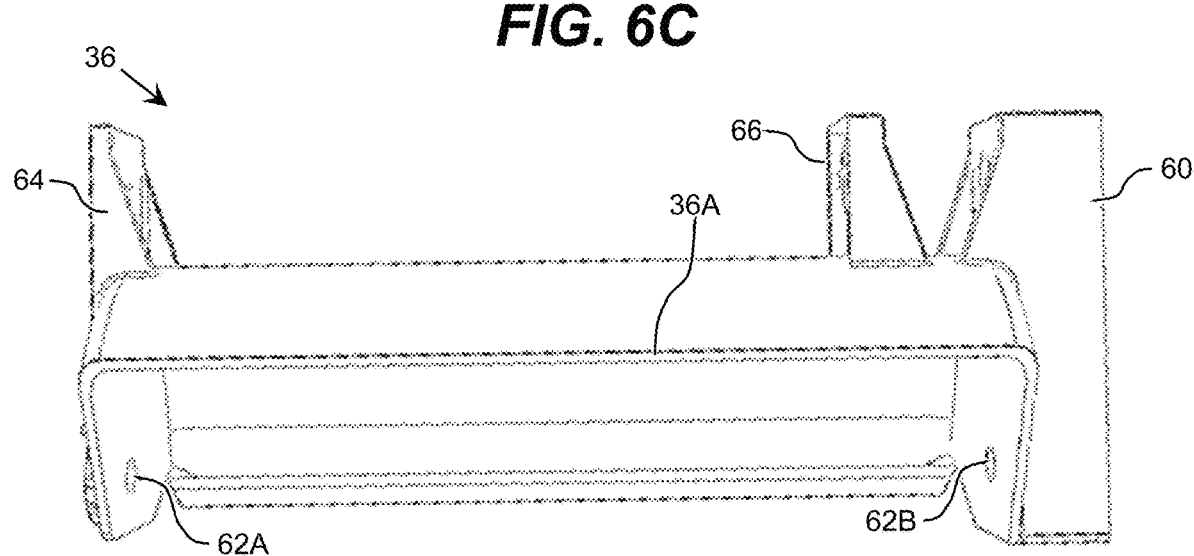
Figure 6D:
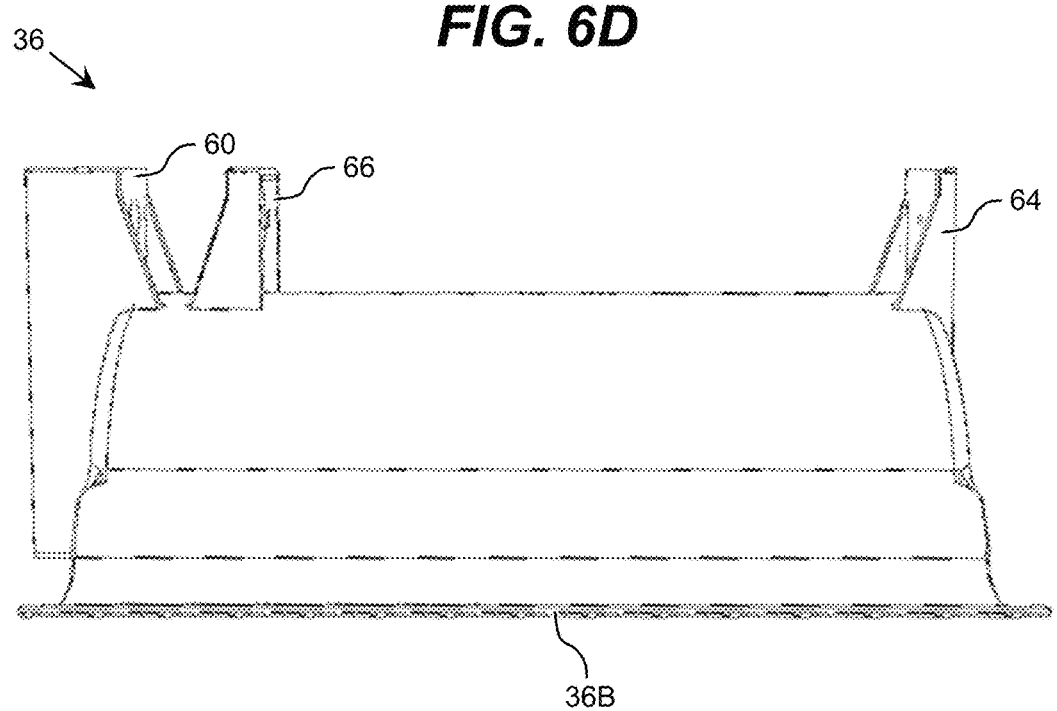
Figure 6E:
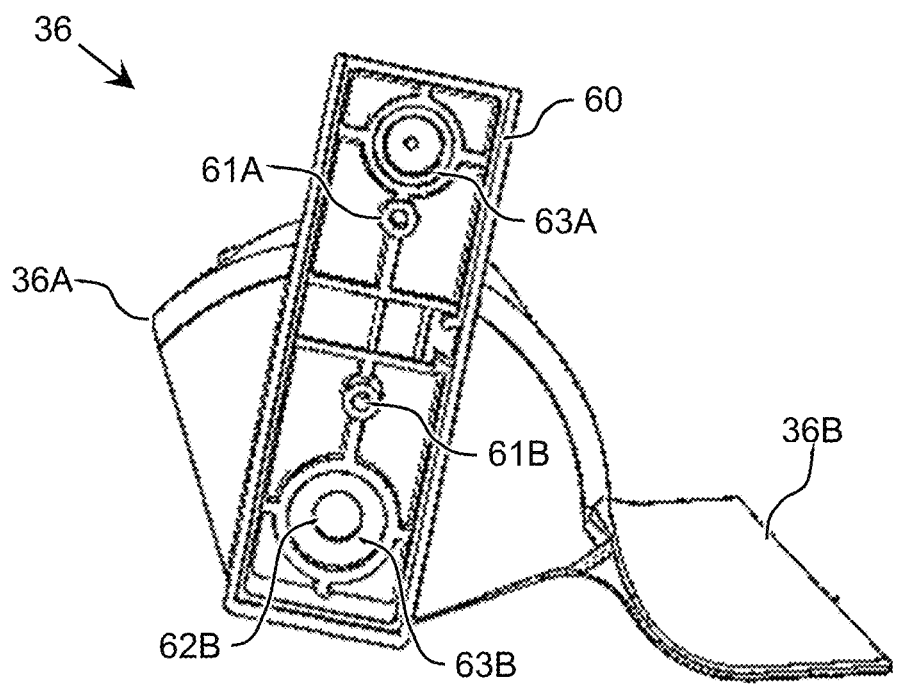
Figure 6F:
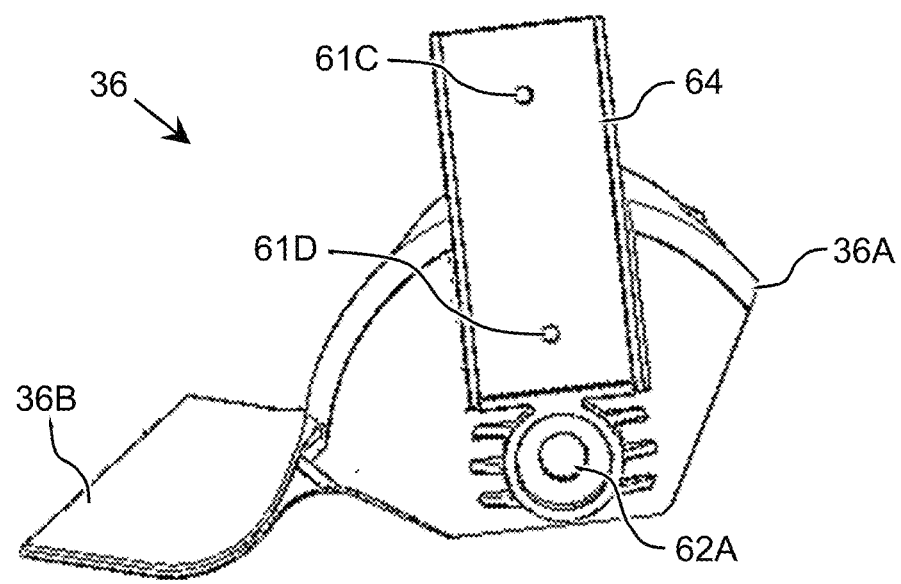
Figure 6G:
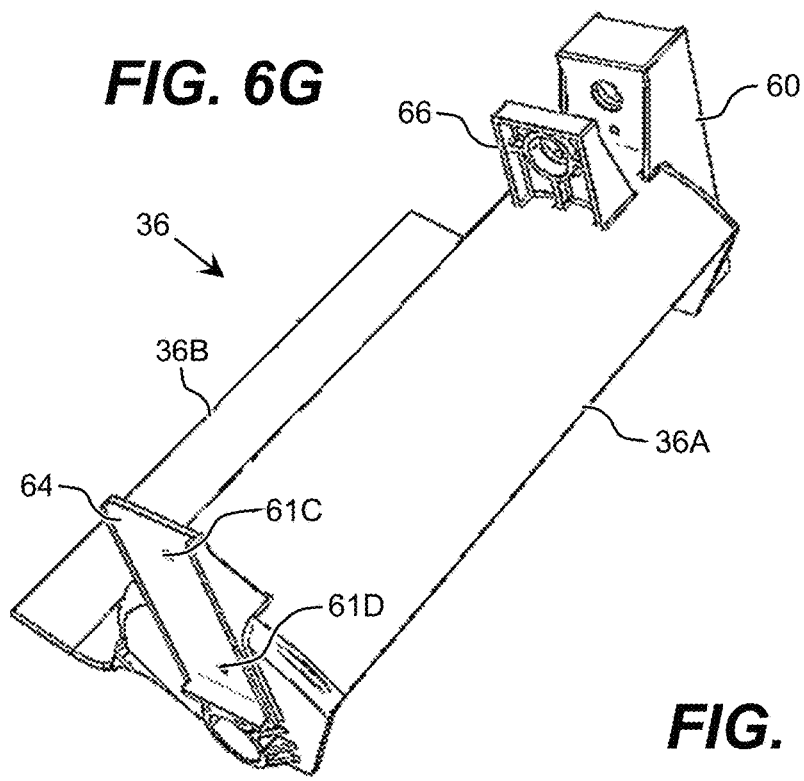
Figure 6H:
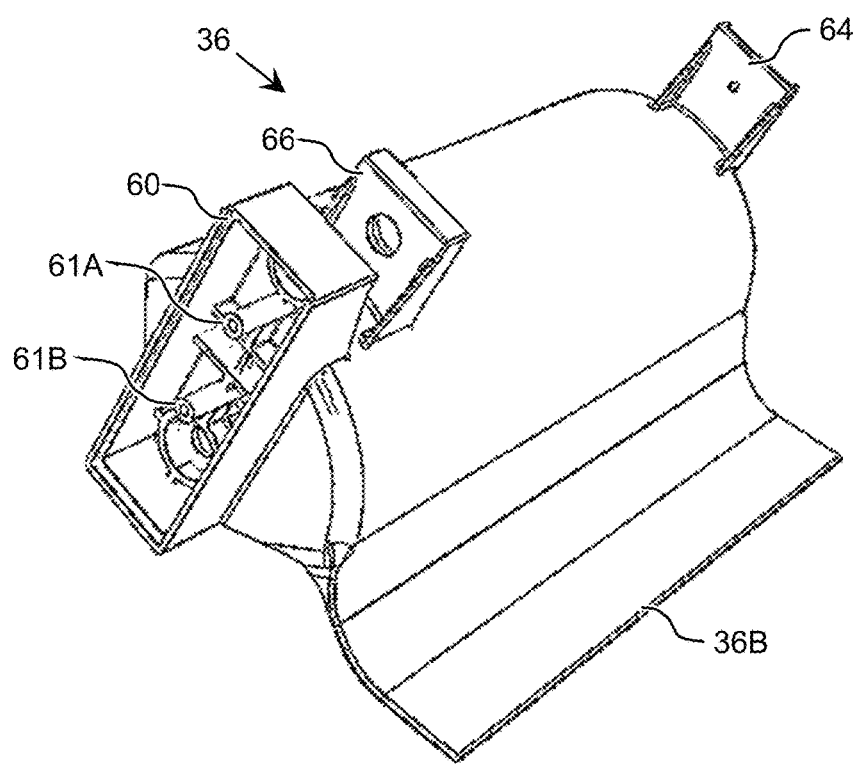
Figure 6I:
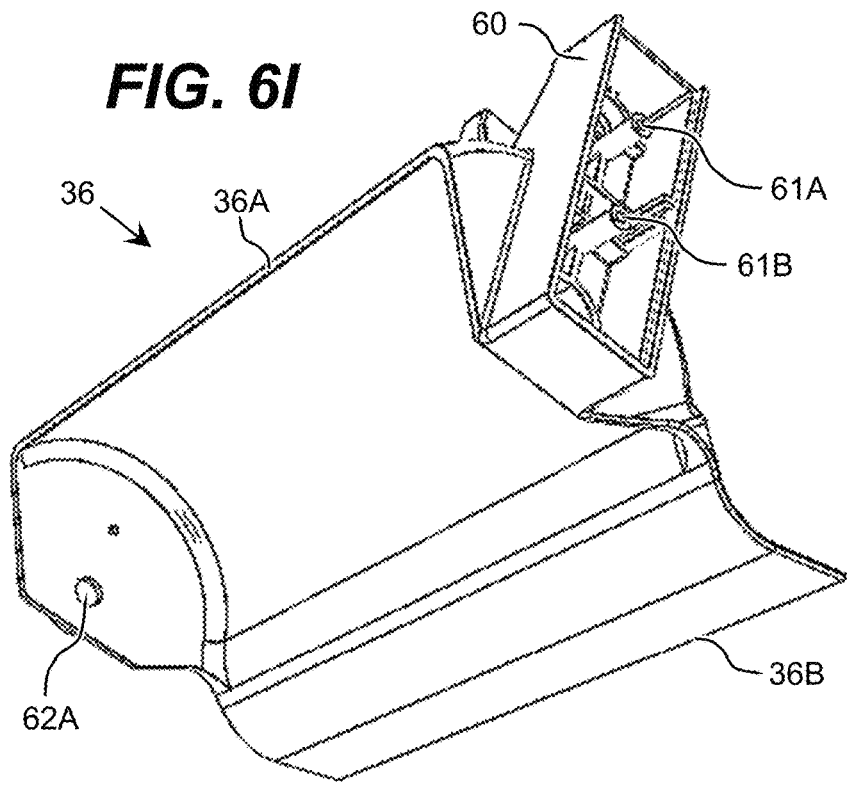
Figure 6J:
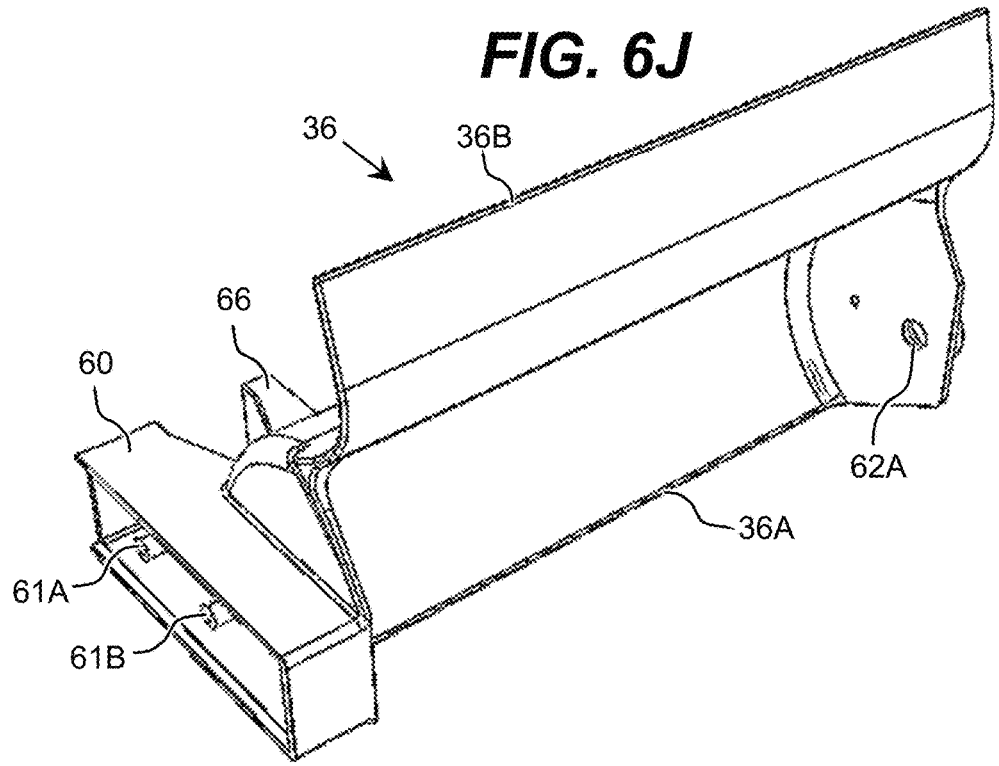

As shown most clearly in FIG. 6E, the gear housing 60 can include a pair of gear mounting structures 63A, 63B, each of which can be sized and configured to mount a corresponding gear 52, 56 as shown in FIG. 4. Additionally, the gear housing 60 can include more than one socket, such as the sockets 61A, 61B, for securing the upper frame 32 to the gear housing 60. Similarly, as shown in FIG. 6F, the frame mounting structure 64 is shown including a pair of sockets 61C, 61D for securing the upper frame 32 to the frame mounting structure 64. As discussed herein, each socket 61A-61D can comprise a threaded socket for securing the upper frame 32 with a screw or bolt, can be an opening to allow the upper frame 32 to be secured with a bolt and nut, and/or the like.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A ground treatment device comprising:
   a metallic upper frame, being a single-piece metallic support and including a horizontal portion; a first vertical portion and a second vertical portion; and a first curved portion and a second curved portion forming transitions between the horizontal portion and the first and second vertical portions, respectively;
   a housing being a single injection molded piece comprising:
   a elevated front portion;
   an elongated back portion;
   a curved top surface extending between the elevated front portion and the elongated back portion;
   opposing exterior sides, the opposing exterior sides including a first exterior side and a second exterior side, each exterior side including a bearing slot for mounting an axle thereto;
   a frame mounting structure located on the first exterior side of the housing, the frame mounting structure extending vertically upward above a highest point of the curved top surface and having a first socket on an exterior vertical surface of the first exterior side, the first socket being a cavity for securing the frame mounting structure to a first vertical surface of the first vertical portion of the metallic upper frame; and
   a gear housing structure located on the second exterior side of the housing, wherein the gear housing structure has an outward facing interior region, the gear housing structure extending vertically above a highest point of the curved top surface and having a second socket on an exterior vertical surface of the second exterior side, the second socket being a cavity for securing the gear housing structure to a second vertical surface of the second vertical portion of the metallic upper frame; and an axle located on an interior portion of the housing, wherein the axle is rotatably mounted to the bearing slots on the opposing exterior sides, and wherein the axle includes a ground treatment attachment mounted thereto, wherein the single injection molded piece exposes the ground treatment attachment in a direction that is opposite a user when the ground treatment device is being used by the user and covers the ground treatment attachment in a vertical direction and in an opposing direction that is closest to the user when the ground treatment device is being used by the user.

2. The ground treatment device of claim 1, wherein the outward facing interior region of the gear housing structure includes:
    a drill gear mounting structure aligned with a drill bit opening in the gear housing structure; and
    an axle gear mounting structure aligned with the bearing slot for the axle.

3. The ground treatment device of claim 2, further comprising:
    a drill gear mounted to the drill gear mounting structure;
    an axle gear mounted to the axle gear mounting structure, wherein the axle is attached to the axle gear; and
    a drive chain mounted to the drill gear and the axle gear.

4. The ground treatment device of claim 3, wherein the housing further includes a drill bit mounting structure located on an external top surface of the housing, the ground treatment device further comprising a drill bit mounted between the drill bit mounting structure and the drill bit opening, wherein the drill bit is attached to the drill gear.

5. The ground treatment device of claim 1, further comprising:
    a first coupler and a second coupler; and
    an operating handle structure secured to the metallic upper frame,
    wherein the first and second couplers fit into the first and second sockets to horizontally secure the metallic upper frame to the the housing at the exterior vertical surfaces of the frame mounting structure and the gear housing structure, wherein the metallic upper frame encloses the exterior vertical surface of the gear housing structure.

6. The ground treatment device of claim 1, further comprising a ground treatment engagement component including:
    a throttle control lever;
    a trigger strap; and
    a throttle cable attached to the throttle control lever and the trigger strap.

7. A ground treatment device comprising:
a housing being a single injection molded piece comprising:
    an elevated front portion;
    an elongated back portion;
    a curved top surface extending between the elevated front portion and the elongated back portion;
    opposing exterior sides, the opposing exterior sides including a first exterior side and a second exterior side, each exterior side including a bearing slot for mounting an axle thereto;
    a frame mounting structure located on a first exterior side of the housing, the frame mounting structure extending vertically upward above a highest point of the curved top surface and having a first socket on an exterior vertical surface of the first exterior side, the first socket being a cavity for accepting a first coupler;
    a drill bit mounting structure located on an external top surface of the housing; and
    a gear housing structure located on another exterior side of the housing, wherein the gear housing structure has an outward facing interior region, the gear housing structure extending vertically above a highest point of the curved top surface and having a second socket on an exterior vertical surface of the second exterior side, the second socket being a cavity for accepting a second coupler, and including:
        a drill gear mounting structure aligned with a drill bit opening in the gear housing structure; and
        an axle gear mounting structure aligned with the bearing slot for the axle;
    a drill gear mounted to the drill gear mounting structure;
    an axle gear mounted to the axle gear mounting structure, wherein the axle is attached to the axle gear;
    a drive chain mounted to the drill gear and the axle gear;
an axle located on an interior portion of the housing, wherein the axle is rotatably mounted to the bearing slots on the opposing sides, and wherein the axle includes a ground treatment attachment mounted thereto, wherein the single injection molded piece exposes the ground treatment attachment in a direction that is opposite a user when the ground treatment device is being used by the user and covers the ground treatment attachment in a vertical direction and in an opposing direction that is closest to the user when the ground treatment device is being used by the user; and
an upper frame, the upper frame being a single-piece structure having a horizontal portion and first and second vertical portions forming a curved transition with the horizontal portion, the first and second vertical portions being horizontally secured with the first and second couplers in the first and second sockets of the frame mounting structure and the gear housing structure, respectively, wherein the upper frame encloses the outward facing interior region of the gear housing structure, and wherein the upper frame is fabricated from metal.

8. The ground treatment device of claim 7, further comprising:
    an operating handle structure secured the upper frame;
    a throttle control lever secured to the operating handle structure;
    a trigger strap; and
    a throttle cable attached to the throttle control lever and the trigger strap.

9. The ground treatment device of claim 8, further comprising:
    a power tool mounted to the housing structure, wherein activation of the throttle control lever causes the trigger strap to activate the power tool; and
    a drill bit mounted between the drill bit mounting structure and the drill bit opening, wherein the drill bit is attached to the drill gear and the power tool and is rotated by the power tool when the power tool is activated.

\* \* \* \* \*